(12) United States Patent
Bijpost et al.

(10) Patent No.: US 8,343,891 B2
(45) Date of Patent: Jan. 1, 2013

(54) METHOD OF IMPROVING THE PROPERTIES OF UREA GRANULES

(75) Inventors: Erik Alexander Bijpost, Nieuwegein (NL); Luc Vanmarcke, Lembeke (BE); Jacobus Gerardus Korver, Wormer (NL); Ruud van Belzen, Middelburg (NL)

(73) Assignee: Yara International ASA, Oslo (NO)

( * ) Notice: Subject to any disclaimer, the term of this patent is extended or adjusted under 35 U.S.C. 154(b) by 1378 days.

(21) Appl. No.: 10/574,784

(22) PCT Filed: Oct. 6, 2003

(86) PCT No.: PCT/EP03/11069
§ 371 (c)(1),
(2), (4) Date: Jun. 30, 2006

(87) PCT Pub. No.: WO2005/040072
PCT Pub. Date: May 6, 2005

(65) Prior Publication Data
US 2007/0125142 A1    Jun. 7, 2007

(51) Int. Cl.
A01N 59/00 (2006.01)
A01N 25/00 (2006.01)
C05C 9/00 (2006.01)

(52) U.S. Cl. .............................. 504/125; 71/28; 71/64.12

(58) Field of Classification Search ................... 504/125; 71/28, 64.12
See application file for complete search history.

(56) References Cited

U.S. PATENT DOCUMENTS

| | | | |
|---|---|---|---|
| 3,392,007 A * | 7/1968 | Christoffel et al. | ............... 71/33 |
| 3,802,903 A | 4/1974 | Shonk et al. | |
| 4,812,158 A | 3/1989 | Iwasaki et al. | |
| 4,936,897 A | 6/1990 | Pipko et al. | |
| 6,217,630 B1 | 4/2001 | Chanen et al. | |

FOREIGN PATENT DOCUMENTS

| | | |
|---|---|---|
| EP | 0 276 179 | 7/1988 |
| SU | 499252 | 12/1976 |
| SU | 806661 * | 2/1981 |
| SU | 19810223 * | 2/1981 |
| WO | 99/15480 | 4/1999 |

OTHER PUBLICATIONS

Canadian Office Action, issued May 23, 2008, in Canadian Application No. 2,541,450.
International Search Report, issued Jun. 23, 2003, in International Application No. PCT/EP 03/11069 of which the present application is the U.S. National Stage.
English version of Decision of Rejection issued Oct. 16, 2009 in the Chinese patent application.
Database WPI, Section Ch, Week 197736, Derwent Publications Ltd., London, GB; AN 1977-64465Y, XP002264982 & SU 499 252 A (As UZB Chem Inst), Dec. 30, 1976.
Database WPI, Section Ch, Week 200131, Derwent Publications Ltd., London, GB; AN 2001-291735, XP002283797 & CN 1 283 600 A (Wang W), Feb. 14, 2001.
English abstract of SU 806661.
English translation of Office Action dated May 18, 2007 issued in Chinese Application No. 2003801104883.
English translation of Office Action dated prior to Sep. 4, 2007 issued in Russian Application No. 2006114423.
Office Action (in English) dated Dec. 29, 2008 issued in European Application No. 03748121.5.
Brazilian Patent Office Search Report dated Jan. 3, 2012 and Brazilian Technical Examination Report dated Jan. 5, 2012 in corresponding Brazilian Application No. PI0318531-1.

* cited by examiner

*Primary Examiner* — Lezah Roberts
*Assistant Examiner* — Nannette Holloman
(74) *Attorney, Agent, or Firm* — Wenderoth, Lind & Ponack, L.L.P.

(57) ABSTRACT

A method of improving the properties of urea granulates, more especially the caking tendency, the dust formation and the foaming tendency in aqueous media, by the addition of an additive to the urea, wherein the additive comprises a carboxylic acid compound with the general formula XY—(Z)—COOH, in which Z is a saturated or unsaturated hydrocarbon with 1-25 carbon atoms and X and Y are selected from the group consisting of a hydrogen atom or a polar organic functional group, and in that the additive is added as a solution in a polar solvent to the urea granulates, which are subsequently dried.

11 Claims, No Drawings

METHOD OF IMPROVING THE PROPERTIES OF UREA GRANULES

The invention relates to a method of improving the properties of urea granulates, more especially the tendency towards caking, dust formation and foaming characteristics in aqueous media, by the addition of an additive to the urea.

Urea is widely used in many applications, such as fertilizer industry, ingredient for cattle feed, and the production of glue and melamine. Urea granules are mainly produced via either a prilling or a granulation process. Before reaching its final application, the urea granules undergo often long term storage and intercontinental transport. Therefore, the urea must be non-fragile and non-caking. To obtain robust granulates often a formaldehyde derivative, such as urea-formaldehyde resin, is added to the urea melt.

The urea prills are sensitive towards clumping owing to storage under pressure, moisture migration and high temperatures. To circumvent this phenomenon, a coating based on polyvinylacetate and surface active compounds, such as disclosed in U.S. Pat. No. 4,812,158, can be applied. These coatings, however, show insufficient anti-caking performance upon treatment of urea granules, especially in humid and warm conditions. These anti-caking additives contain surface-active compounds, which promote dust formation of urea under humid conditions. The increased amount of fines will enhance the caking of the urea and can cause severe dust problems upon handling. Moreover, the presence of surface-active components can give rise to foaming, when applying the urea in aqueous media as is common in glue production and urea-ammonium nitrate solutions.

In view of the problems still present in the handling of the urea granulates, there is still a need for a chemical product, which can be used as an additive for urea to decrease both the caking tendency and the dust formation of the granules. This compound should be added in a small quantity on the surface of the granulates, have a low prize, a good efficiency, be non-foaming and environmentally friendly.

It is therefore an object of the invention to provide such a compound. This object is achieved by the method according to the preamble in which the additive comprises a carboxylic acid compound with the general formula XY—(Z)—COOH, in which Z is a saturated or unsaturated hydrocarbon with 1-25 carbon atoms and X and Y are selected from the group consisting of a hydrogen atom or a polar organic functional group, and in that the additive is added as an aqueous solution to the urea granulates, which are subsequently dried.

Preferably the polar organic functional group is selected from a group consisting of a carboxylic acid group, a hydroxyl group, an amine group or an acetal group.

From these polar functions, hydroxyl groups and carboxylic acid groups were found to give the best performance towards preventing caking. In addition, the dust formation of the treated urea granulates appeared to be reduced remarkably. Moreover, it was demonstrated that the carboxylic acid derivatives do not cause any foaming upon applying the coated urea in glue production.

The best results with a compound according to the invention were obtained when X is a hydrogen atom or a hydroxyl group, and Y is a carboxylic acid group.

The carboxylic acid compound according to the invention is applied to the urea granulates in a polar solvent, preferably water. The concentration of the compound in that solution must be from 0.5-60 wt %, preferably from 5-30 wt %.

In this concentration the compound is completely solvable and it is guaranteed that substantial recrystallisation of the urea surface takes place.

A sufficient coating of the urea granules with the compound according to the invention can be obtained by using an amount of carboxylic acid compound of 100-10,000 ppm, preferably 500-3,000 ppm based upon the weight of the urea granules.

The application of the aqueous solution to the urea granules is performed while the temperature of these granules is between 30 and 90° C., preferably between 40-70° C.

The invention also relates to a carboxylic acid compound to be used in the method according to the invention, which compound is characterized in that it has the general formula XY—Z—COOH in which Z is a saturated or unsaturated hydrocarbon with 1-25 C-atoms, and X and Y are selected from the group consisting of a hydrogen atom or a polar organic functional group.

In order to show the advantage of the method and the compound according to the invention a number of experiments has been carried out.

The additives were purchased from Sigma-Aldrich. These compounds were dissolved in water with a concentration of 20% (m/m), unless stated otherwise. The urea granules used, internally treated with urea-formaldehyde, were supplied by Hydro Agri Sluiskil B.V., The Netherlands.

Before applying the coating, the urea (1.0 kilogram per sample) is stored in sealed plastic jars in an oven at 50° C. for 16 hours. The treatment has occurred as follows: The urea is placed in a rotating coating drum, which has a temperature of approximately 50° C. Then 0-5000 ppm of a coating is sprayed on the fertilizer, followed by rotating the drum for another 5 minutes. The treated fertiliser is transferred into a plastic jar. After sealing the jar, the urea Is allowed to cool down to room temperature over 24 hours.

EXPERIMENT 1

To enhance caking of urea, the granules have been allowed to take up 0.5% of water by storage in a climatic chamber (temperature=20° C., relative humidity=80%). The clumping tendency as well as the compressibility of the urea granules has been tested by filling a transparent round tube having an inner diameter of 3 cm with 40 grams "wet" urea. Onto this a plunger has been brought, through which a pressure of about 600 kPa has been exerted onto the sample. Directly after the application of the overpressure and again after 24 hours the height of the urea column has been measured. The relative difference in height, which is a measure for the compressibility, has been calculated from these two values ($\Delta$ height (%)). The clumping tendency of the urea granules has been determined by measuring the power (N) to break the caked sample formed in the transparent round tube. The results are the average of at least five measurements.

The following additives have been tested as a 20% solution in water applying a dosage of 1500 mg per kilogram urea.

| Additive | Compressibility ($\Delta$ height (%)) | Clumping tendency (N) |
|---|---|---|
| Blank | 5 | 4.9 |
| Polyvinylacetate: alkylsulphate = 1:2[1] | 5 | 5.7 |
| Citric acid | 3 | 3.4 |
| Lactic acid | 4 | 4.7 |
| Maleic acid | 3 | 3.6 |
| Malic acid | 4 | 2.8 |
| Malonic acid | 3 | 2.6 |
| Succinic acid[2] | 3 | 2.0 |

-continued

| Additive | Compressibility (Δ height (%)) | Clumping tendency (N) |
|---|---|---|
| Tartaric acid | 3 | 2.9 |
| K—Na tartrate | 5 | 5.6 |
| Gluconic acid | 4 | 3.3 |
| Glucose | 4 | 5.6 |
| Pectic acid[3] | 4 | 4.4 |
| 4-aminobutyric acid | 4 | 4.9 |
| Glycine | 4 | 4.3 |
| Gallic acid[3] | 3 | 3.0 |

[1]mixture as disclosed in U.S. Pat. No. 4,812,158, used as a formulation consisting of 67% (m/m) water, 11% (m/m) polyvinylacetate and 22% (m/m) alkylsulfate.
[2]solution has been warmed up to 50° C. before treatment of urea.
[3]applied as a 10% suspension at 80° C. with a dosage of 3000 ppm.

The experiment clearly demonstrates that the caking tendency of urea granules can be decreased up to 60% upon treating urea with a polar group-substituted carboxylic acid compound. A mixture according to U.S. Pat. No. 4,812,158 showed an increase of clumping. A similar result has been found for a carboxylate-containing additive, viz. K—Na tartrate. The reduction of the caking tendency of urea granules appeared to be the strongest upon using dicarboxylic acids. The compressibility of all treated urea is low compared to other types of urea. However, in all cases treatment of urea granules by carboxylic acids decreases the compressibility of urea. Since the rigidity of the urea will increase, the urea will be less prone to caking.

EXPERIMENT 2

The effect of the dosage of the additive on urea granules has been studied using a 20% (m/m) succinic acid solution in water. The solution has been warmed up to 50° C. before treatment of urea.

| Dosage (ppm) | Compressibility (Δ height (%)) | Clumping tendency (N) |
|---|---|---|
| Blank | 5 | 4.9 |
| 250 | 4 | 3.3 |
| 500 | 3 | 2.6 |
| 750 | 3 | 2.3 |
| 1000 | 3 | 2.1 |
| 1500 | 3 | 2.0 |
| 3000 | 3 | 1.7 |
| 5000 | 3 | 2.7 |

The experiments shows that the optimum dosage for outer treatment of urea granulates with an additive according to the new invention is between 500 and 3000 ppm, based on the weight of urea.

EXPERIMENT 3

The dust level of the treated urea granules has been studied as follows. After coating the samples for Experiment 1 (1500 ppm additive based on the weight of urea) 250 grams of these treated urea granules have been stored at 40° C. for four weeks. Afterwards 50 grams (accurately weighed) urea has been transferred into a 500 ml three-neck round bottom flask. The flask has been provided with a glass column and a gas capillary, connected with a compressed air cylinder. The end of the gas capillary is placed into the urea. For 15 seconds air (2 bar overpressure) is blown through the urea, causing a fluid bed system. The weight of the remaining urea has been determined accurately on an analytical balance. The loss of weight is a measure for the amount of free dust. The urea has been transferred back into the three-neck flask. For 1 minute compressed air is blown through the urea, allowing the formation of abrasion dust. The remaining urea has been weighed on an analytical balance. The second loss of weight is a measure for abrasion dust. The determinations have been performed in two-fold.

| Additive | Free dust (ppm) | Abrasion dust (ppm) | Total dust (ppm) |
|---|---|---|---|
| Blank | 56 | 80 | 136 |
| Polyvinylacetate: alkylsulphate = 1:2[1] | 84 | 116 | 200 |
| Citric acid | 49 | 63 | 112 |
| Lactic acid | 43 | 77 | 120 |
| Maleic acid | 40 | 74 | 114 |
| Malic acid | 25 | 46 | 71 |
| Malonic acid | 29 | 56 | 85 |
| Succinic acid[2] | 30 | 62 | 92 |
| Tartaric acid | 36 | 29 | 65 |
| K—Na tartrate | 34 | 41 | 75 |
| Gluconic acid | 22 | 36 | 58 |
| Glucose | 50 | 59 | 109 |
| Pectic acid[3] | 52 | 52 | 104 |
| 4-aminobutyric acid | 34 | 65 | 99 |
| Glycine | 34 | 51 | 85 |
| Gallic acid[3] | 44 | 62 | 106 |

[1]mixture as disclosed in U.S. Pat. No. 4,812,158, used as a formulation consisting of 67% (m/m) water, 11% (m/m) polyvinylacetate and 22% (m/m) alkylsulfate.
[2]solution has been warmed up to 50° C.
[3]applied as a 10% suspension at 80° C. with a dosage of 3000 ppm.

It has been shown, that the formation of dust can be substantially suppressed by treating urea with carboxylic acid containing compounds.

EXPERIMENT 4

The foaming behaviour of coated urea has been studied by performing a small scale wood glue production test. For this purpose, 40 gram of urea has been transferred into a 2 liter glass beaker. The urea has been dissolved in a mixture of 50 ml demineralised water and 45 ml formaldehyde (37%). The mixture has been stirred at a constant speed (375 rpm) by means of a magnetic stirrer and warmed up to 90° C. The moment at which 90° C. is reached, 1 ml of glacial acetic acid Is added immediately, causing a strong foaming. The highest foam level reached is marked on the beaker. The corresponding volume is a measure for the foam formation: the lower the volume, the lower the foaming tendency. The results are the average of at least two measurements.

The following additives have been tested as a 20% solution in water, applying a dosage of 1500 ppm based on the weight of urea.

| Additive | Foam level (ml) |
|---|---|
| Blank | 180 |
| Polyvinylacetate: alkylsulphate = 1:2[1] | 650 |
| Citric acid | 190 |
| Lactic acid | 200 |
| Maleic acid | 180 |
| Malic acid | 200 |
| Malonic acid | 190 |
| Succinic acid | 170 |
| Tartaric acid | 210 |
| K—Na tartrate | 280 |
| Gluconic acid | 180 |
| Glucose | 210 |
| Pectic acid | 190 |

-continued

| Additive | Foam level (ml) |
|---|---|
| 4-aminobutyric acid | 240 |
| Glycine | 230 |
| Gallic acid | 200 |

[1]mixture as disclosed in U.S. Pat. No. 4,812,158, used as a formulation consisting of 67% (m/m) water, 11% (m/m) polyvinylacetate and 22% (m/m) alkylsulfate.

The small scale wood glue production test has demonstrated that the additives according to the invention in comparison to blank material do not cause any additional foam when applying treated urea in aqueous media. This was expected, since the compounds as such do not posses surface active properties.

EXPERIMENT 5

In order to test the performance of the carboxylic acid containing coatings towards urea prills, formaldehyde-free urea prills have been treated with selected additives. Afterwards the urea has been allowed to take up 0.2% of water by storage in a climatic chamber. The clumping tendency as well as the compressibility of the prills has been examined as described in Experiment 1.

The following additives have been tested as a 20% solution in water applying a dosage of 500 mg per kilogram urea.

| Additive | Compressibility (Δ height (%)) | Clumping tendency (N) |
|---|---|---|
| Blank | 4 | 2.9 |
| Polyvinylacetate: alkylsulphate = 1:2[1] | 2 | 0.7 |
| Malic acid | 2 | 0.9 |
| Malonic acid | 2 | 1.2 |
| Succinic acid[2] | 1 | 0.7 |
| Tartaric acid | 2 | 1.3 |

[1]mixture as disclosed in U.S. Pat. No. 4,812,158, used as a formulation consisting of 67% (m/m) water, 11% (m/m) polyvinylacetate and 22% (m/m) alkylsulfate.
[2]solution has been warmed up to 50° C. before treatment of the urea prills.

The experiment shows that clumping of urea prills can be reduced substantially by using coating additives according to the invention.

The invention claimed is:

1. A method for reducing caking tendency, dust formation, and foaming tendencies when in aqueous media, of urea granules, where the method consists of adding an additive to the surface of the urea granules,
wherein the additive consists of a carboxylic acid compound with the general formula XY—(Z)—COOH, in which Z is a saturated or unsaturated hydrocarbon with 1-25 carbon atoms, and X and Y are selected from the group consisting of a hydrogen atom or a polar organic functional group, and wherein the additive is added as a solution in a polar solvent to the urea granulates, which are subsequently dried; wherein the solution consist of the additive and the polar solvent.

2. The method according to claim 1, wherein the polar solvent is water.

3. The method according to claim 1, wherein Z has 2-5 carbon atoms.

4. The method according to claim 1, wherein the polar organic functional group is selected from the group consisting of a carboxylic acid group, a hydroxyl group, an amine group and an acetal group.

5. The method according to claim 1, wherein X is a hydrogen atom or a hydroxyl group and Y is a carboxylic acid group.

6. The method according to claim 1, wherein the solution has a concentration of 0.5-60 wt % of the carboxylic acid compound.

7. The method according to claim 6, wherein the concentration is 5-30 wt %.

8. The method according to claim 1, wherein based upon the weight of urea, the concentration of the carboxylic acid compound is 100-10,000 ppm.

9. The method according to claim 1, wherein during the addition of the solution the temperature of the urea is 30-90° C.

10. The method according to claim 1, wherein based upon the weight of urea, the concentration of the carboxylic acid compound is 500-3,000 ppm.

11. The method according to claim 1, wherein during the addition of the solution the temperature of the urea is 40-70° C.

* * * * *